Figure 1:
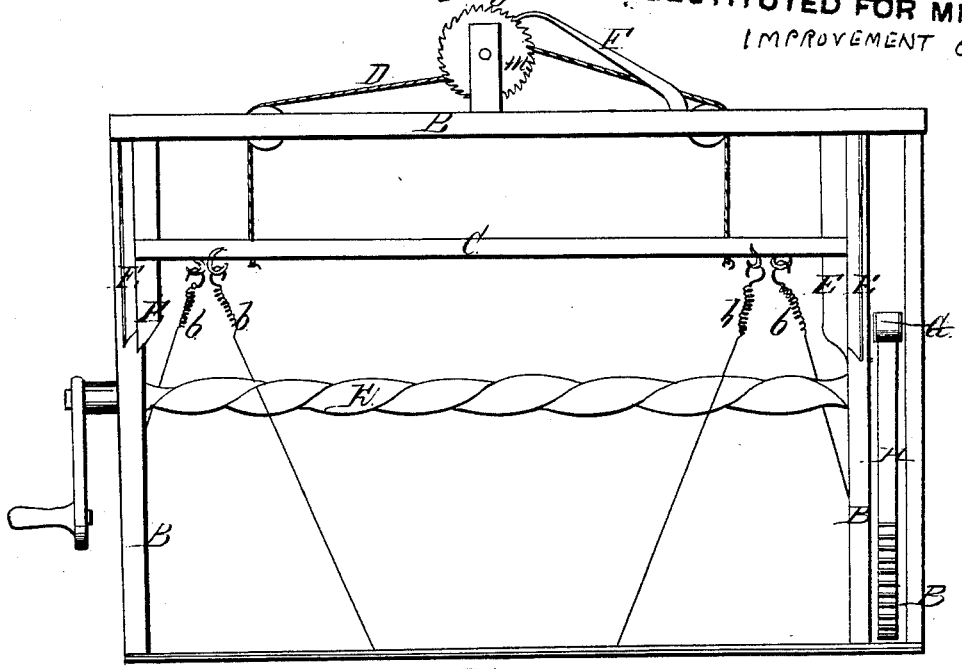
Figure 2:
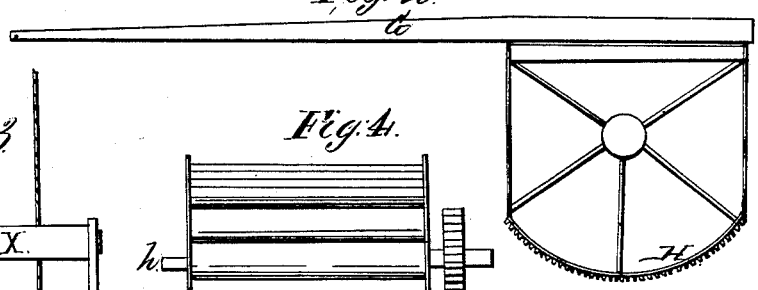
Figure 3:
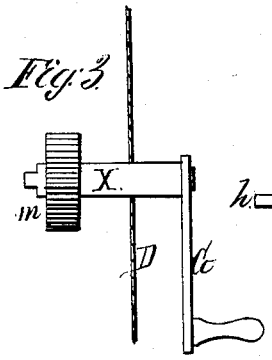
Figure 4:
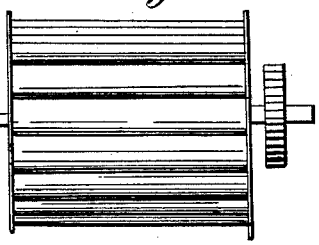

68. TEXTILES, FLUID TREATING APPARATUS.

Draftsman

75

J. L. Wilkinson,

Washing Machine.

No. 306. A. I. Dec. 4, 1860.

SUBSTITUTED FOR MISSING COPY
IMPROVEMENT ON 25,542

Witnesses:
Mary A. Young
D. H. Young

Inventor:
Asbury Wilkinson

N. PETERS, PHOTO-LITHOGRAPHER, WASHINGTON, D. C.